No. 735,844. PATENTED AUG. 11, 1903.
F. B. TOWNSEND.
BRAKE MECHANISM FOR VEHICLES.
APPLICATION FILED MAY 24, 1902.
NO MODEL. 2 SHEETS—SHEET 1.

Frank B. Townsend, Inventor

Witnesses

No. 735,844. PATENTED AUG. 11, 1903.
F. B. TOWNSEND.
BRAKE MECHANISM FOR VEHICLES.
APPLICATION FILED MAY 24, 1902.
NO MODEL. 2 SHEETS—SHEET 2.
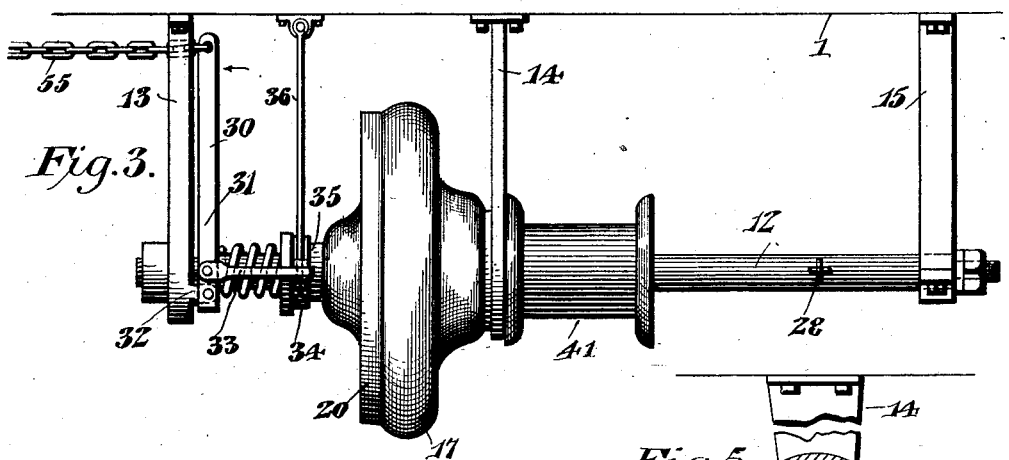
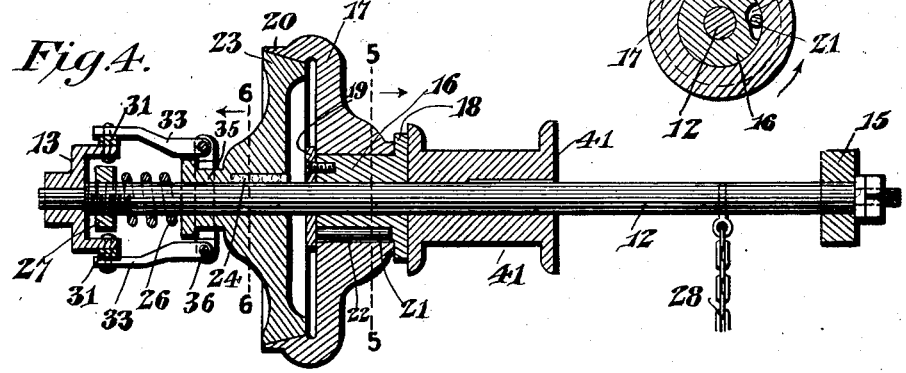
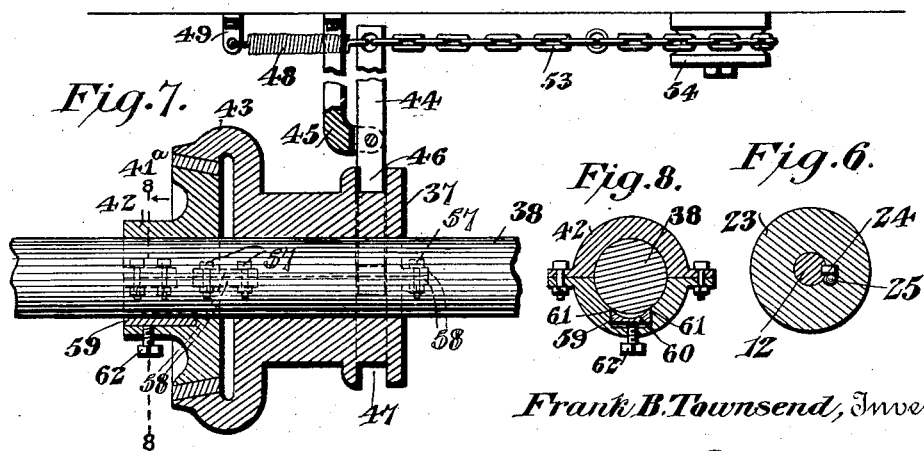
Frank B. Townsend, Inventor
Witnesses No. 735,844. Patented August 11, 1903.

UNITED STATES PATENT OFFICE.

FRANK BOGART TOWNSEND, OF PENN YAN, NEW YORK, ASSIGNOR OF ONE-HALF TO LEWIS D. PERRIN, OF ROCHESTER, NEW YORK.

BRAKE MECHANISM FOR VEHICLES.

SPECIFICATION forming part of Letters Patent No. 735,844, dated August 11, 1903.

Application filed May 24, 1902. Serial No. 108,805. (No model.)

*To all whom it may concern:*

Be it known that I, FRANK BOGART TOWNSEND, a citizen of the United States, residing at Penn Yan, in the county of Yates and State of New York, have invented a new and useful Brake Mechanism for Vehicles, of which the following is a specification.

My present invention relates to novel brake mechanism for vehicles designed with special reference to the equipment of railway-cars, but susceptible of adaptation for the equipment of vehicles of other classes—as, for instance, automobiles or the like.

The object of the invention is to produce a simple, comparatively inexpensive, and positively-operating brake mechanism which may be readily applied to the running-gear in connection with the usual forms of brake shoes and beams without necessitating any changes whatever in the vehicle structure.

A further object of the invention is to arrange the mechanism for easy control by the motorman or other operator and to effect the application of the brakes by power supplied by the movement of the vehicle, so that the brakes may be quickly applied to stop the vehicle without depending in any manner upon the proper operation of the motor employed for the propulsion of the car or other vehicle.

With these and other objects in view, all as will hereinafter more fully appear, the invention comprehends in its preferred embodiment that construction and arrangement of parts to be more fully described, illustrated in the accompanying drawings, and succinctly defined in the appended claims.

Figure 1:
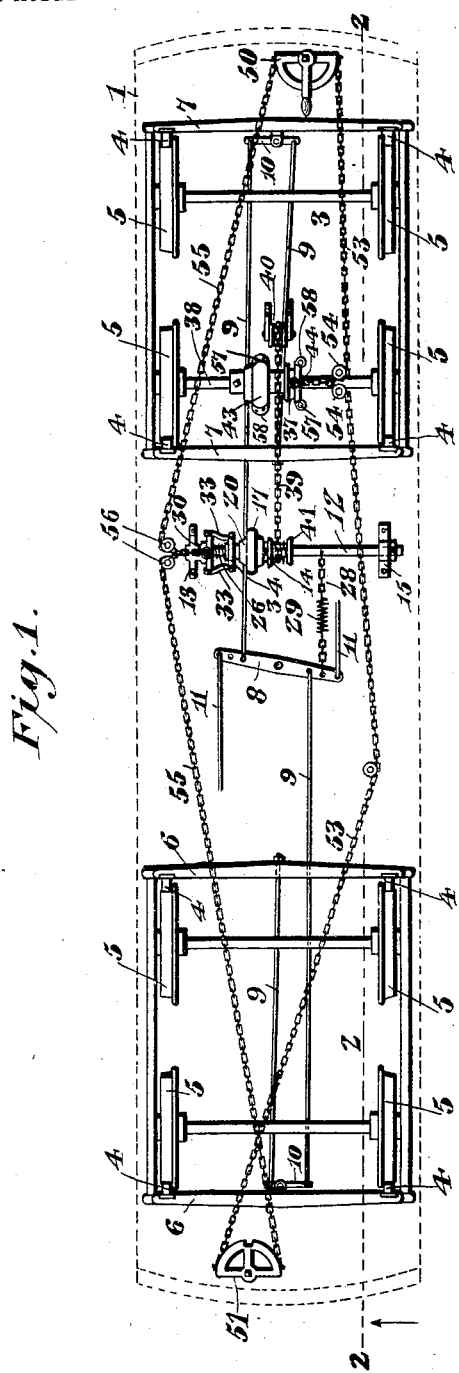
Figure 2:
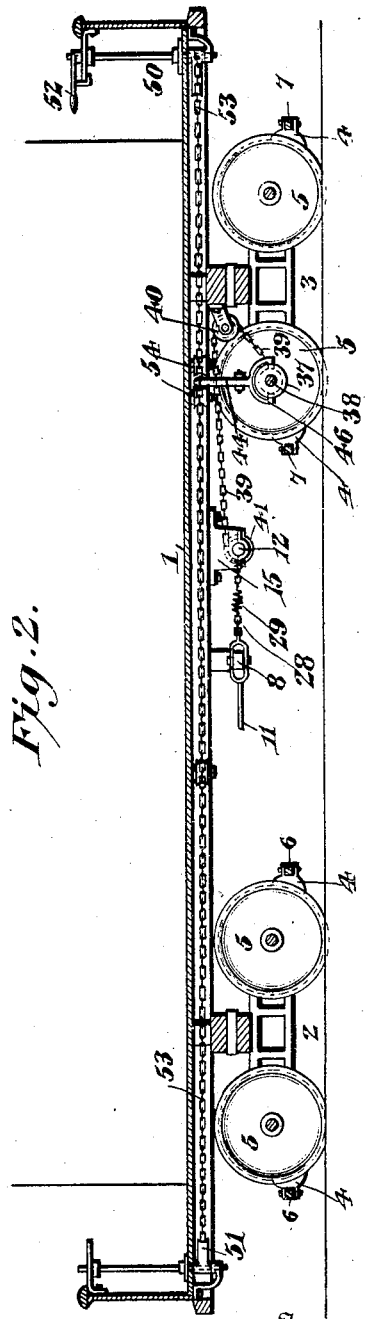

In said drawings, Figure 1 is a top plan view of the running-gear equipped with my novel brake mechanism, the floor or platform of the car being illustrated in dotted lines. Fig. 2 is a sectional elevation on the line 2 2 of Fig. 1 looking in the direction of the arrow. Fig. 3 is an elevation, on an enlarged scale, of the brake-clutch, shaft, and associated parts for holding the brake mechanism in its set position. Fig. 4 is a longitudinal sectional view of the subject-matter of Fig. 3. Fig. 5 is a detailed view on the line 5 5 of Fig. 4. Fig. 6 is a similar view on the line 6 6 of Fig. 4, and Fig. 7 is a sectional elevation of the axle-clutch and associated parts. Fig. 8 is a detail sectional view on the line 8 8 of Fig. 7.

Like numerals of reference are employed to designate corresponding parts throughout the views.

The car platform or floor (indicated by the numeral 1) is supported, as usual, upon the trucks 2 and 3, equipped, as usual, with brake mechanism comprehending brake-shoes 4, disposed to engage the wheels 5 and supported at the opposite ends of brake-beams 6 and 7. These brake-beams are operated through the medium of a brake-lever 8, pivoted to the under side of the car-floor, substantially at the center thereof, and connected to the brake-beams by motion-transmitting devices, usually comprehending links or connecting-rods 9 and sublevers 10. This brake mechanism is quite ordinary, and a detailed description of its construction and operation is therefore deemed to be unnecessary; but since the lever 8 is usually operated by hand-levers (not illustrated) I have shown fragments of connecting-rods 11, employed to transmit motion from the hand-levers to the brake-lever 8.

The present invention is particularly concerned with novel mechanism for shifting the brake-lever 8 to apply the brakes by power generated by the movement of the vehicle, and it should be understood that this novel brake-operating mechanism may be employed in connection with or independently of the manually-operated devices generally required by law.

At a point preferably adjacent to the brake-lever 8 is mounted what may be termed a "brake-shaft" 12, journaled in suitable bearings at the lower side of bearing-brackets 13, 14, and 15, depending from the car-floor, to which they are bolted. The brackets 13 and 15 are disposed at the opposite ends of the shaft, and the bracket 14 is located at an intermediate point. (See Fig. 3.) The bearing at the lower end of the bracket 14 is formed by an elongated bearing-sleeve 16, upon which is rotatably mounted a female clutch member 17, confined upon the sleeve 16, between a collar 18 at one end thereof and a confining-plate 19, apertured for the reception of the shaft 12, and secured—as, for instance, by screws, as shown—to the other end of the sleeve. The clutch member 17 is provided with a friction-flange 20, disposed in a plane beyond one end of the sleeve 16, and for a purpose to be made plain is designed to rotate freely in one direction and to be automatically held against movement in the opposite direction. To attain this end, suitable clutch or ratchet mechanism is interposed between the clutch member 17 and the sleeve 16, such mechanism being embodied in the present construction in the form of a roll-clutch, comprehending a roller 21, located within a roller pocket or recess 22, formed in the peripheral face of the sleeve and having an inclined bottom wall, as best shown in Fig. 5. When the clutch member is rotated in the direction of the arrow in Fig. 5, the roller 21 will seek the deep end of the pocket 22 and the member may have unrestricted rotary movement. If, however, the movement of the member is reversed, the roll, moving to the shallow end of the pocket, will wedge the member 17 to the sleeve, and thereby prevent further relative movement of these parts. Between the member 17 and the bracket 13 the shaft 12 constitutes a support for a male clutch member 23, splined upon the shaft as by a spline or feather 24, preventing independent rotary movement of the member upon the shaft. As this male clutch member, however, is designed to be moved into and out of engagement with the female member 17, the former is provided with a ball-bearing 25, comprising a series of balls mounted in a pocket in the member and bearing upon the shaft, so that a sliding movement of the member upon the shaft toward and from its engaging position will be rendered substantially antifrictional. The contour of the male clutch member 23 is that of a section of a cone, to permit of its being wedged into the correspondingly-formed socket defined within the friction-flange 20 of the member 17. The frictional engagement of the members is normally maintained by a spiral spring 26, encircling the shaft and bearing at its opposite ends against an adjustment-nut 27 and the clutch member 23, the nut being screwed upon the shaft, as shown, in order to permit the adjustment thereof for the purpose of regulating the tension of the spring, and thereby determining the extent of the frictional engagement between the clutch members.

The shaft 12 has been designated the "brake-shaft," for the reason that its rotation is designed to effect the winding thereon of a brake-chain 28, secured at one end to the shaft and at its opposite end to the lever 8 at one side of the fulcrum of the latter. By preference a spring 29 is included in this chain, as shown in Fig. 1, in order that the parts may yield slightly under exceptional strain, and thereby prevent such derangement of the parts as might otherwise be occasioned under extraordinary circumstances. When the brake-shaft 12 is rotated in the direction of the arrow in Fig. 5 in the manner to be hereinafter described, the chain 28 will be wound thereon and the brake-lever 8 will be swung to effect the application of the brakes. During this movement the member 23 rotating with the shaft will carry the clutch member 17 with it by reason of the frictional engagement between the members. Upon the disconnection of power from the brake-shaft the resistance opposed by the brake system proper, or, more properly, the tendency of the brake-shoes to move to their unset positions, will effect the reverse rotation of the shaft. This movement will be at once interrupted, however, by the movement of the clutch-roller 21 to the shallow end of its pocket, thus rigidly clutching the female member 17 to the bearing-sleeve 16 and checking the reverse rotation of the shaft by reason of the frictional engagement between the two clutch members. The brake-shoes will be held in their set positions until the members of the brake-clutch are disengaged. Such disconnection may be effected through any instrumentality which will withdraw the frictionally-engaged faces of the members from contact with each other; but I prefer to control the engagement of the clutch by mounting a brake-clutch lever 30, having a bifurcated lower end 31, upon suitable bearing-lugs 32, projecting from the lower end of the bracket 13. At a point to one side of its fulcrum the lever 30 is pivotally connected with the ends of a pair of arms 33, connected at their opposite ends to a collar 34, mounted upon the reduced neck 35 of the clutch member 23, said collar being preferably steadied by a guy-rod 36, depending from the car-floor. By moving the lever 30 in the direction of the arrow in Fig. 3 the member 23 may be drawn out of engagement with the member 17 through the medium of the arms 33 and the collar 34, constituting a yoke, and against the resistance of the spring 26. When such disengagement is effected, the brake-shaft 12 will be free to rotate in a reverse direction and the brake system will be released and the brakes unset.

We now come to a consideration of that mechanism by means of which the motion of the vehicle is transmitted to the brake-shaft to wind the brake-chain upon the latter and set the brakes. This mechanism comprehends, primarily, a drum 37, mounted upon one of the vehicle-axles—as, for instance, the axle 38—and equipped with means whereby said drum may be connected to and disconnected from the axle at the will of the operator. This drum 37, which for convenience I shall call the "axle-drum," is connected to one end of a flexible piece or chain 39, passed around an idler 40 and having its opposite end secured to a second drum 41, keyed upon the brake-shaft 12. Normally—that is to say, when the brake is unset—the chain 39 will be wound upon the drum 41 and will be unwound from the drum 37; but when the drum 37 is connected to the vehicle-axle for rotation therewith the chain will be wound upon said drum 37 and unwound from the drum 41, while the movement of the brake-shaft with the latter drum will effect the winding of the brake-chain 28 in the manner heretofore recited to set the brake. It should be noted that the foregoing operation will be effected by movement of the vehicle in either direction, because when the chain 39 is entirely unwound from the axle-drum the rotation thereof in either direction will wind the chain thereon, and thus effect the application of the brakes in the manner stated.

Associated with the drum 37 is an axle-clutch 41$^a$, comprising a male member 42, fixed upon the axle, and a female member 43, in the form of an annular clutch-flange, extending from one end of the drum 37 and disposed for frictional engagement with the trunco-conical member 42. The engagement and disengagement of the drum 37 from the axle 38 is effected by the endwise movement of the drum through the medium of a lever 44, fulcrumed upon a pendent bracket 45 and formed with a spanner end 46, engaging an annular groove 47, formed in one end of the drum. The drum is normally retained in its disengaged position by a spring 48, connected at one end to the lever 44 and at its opposite end to a lug 49, fixed to the under side of the car-truck. It will therefore appear that under normal conditions the axle-drum 37 will be disconnected from the axle to permit unrestricted rotary movement of the latter as the vehicle advances without in any wise affecting the brake mechanism. If, however, it is desired to apply the brake, it is simply necessary to swing the lever 44 against the resistance of the spring 48, and thereby cause the members of the axle-clutch to engage each other for the purpose of fixing the axle-drum to the axle for movement therewith. Continued movement of the vehicle will now cause the chain 39 to be wound upon the axle-drum and unwound from the drum 41, rotating the brake-shaft and setting the brakes. This movement of the parts will continue until the maximum frictional resistance is opposed to the movement of the vehicle, and it will be noted that this resistance is furnished not only by the frictional engagement of the brake-shoes with the vehicle-wheels, but that it is augmented by the frictional resistance of both the brake and axle clutches. Upon the release of the lever 44 the spring 48 will restore it to its normal position, and thus disconnect the axle-drum 37 from the axle. The brake will not be released, however, because, as we have already seen, the reverse rotation of the brake-shaft 12 will be resisted by the brake-clutch, and the brake will therefore remain set until the lever 30 has been moved against the resistance of the spring 26 to effect the separation of the members of the brake-clutch.

We will now consider the controlling mechanism by means of which an operator located at either end of the vehicle may effect the setting or release of the brake mechanism, as desired. At each end of the car is located a controller 50 or 51, the form of which is not essential, but is preferably that of a swinging segment operated by a removable handle 52, as shown. The controller 50 is connected at one end to a flexible piece or chain 53, passed around an idler 54, and connected at its opposite end to the upper extremity of the lever 44 of the axle-clutch, while the opposite end of said controller is connected to a flexible piece or chain 55, passed around an idler 56 and connected to the upper end of the lever 30 of the brake-clutch. The controller 51 at the opposite end of the vehicle is connected to its two clutch-levers in precisely the same manner as the controller 50, the only exception being that the two connecting-chains are crossed, so that the movement of either controller to the right or to the left, as the case may be, will effect precisely the same result with respect to the control of the brake mechanism. Assuming the vehicle to be moving in the direction of the arrow in Fig. 1 and that it is desired to apply the brakes, the operator by moving the handle 52 to the right will draw upon the chain 53 and will slack the chain 55. This will have no effect whatever upon the lever of the brake-clutch, but will shift the axle-drum 37 to effect the engagement of the axle-clutch. The drum 37 will therefore rotate with the axle 38 and the brake will be applied. If the handle 52 is retained in this position until after the chain 39 is entirely unwound from the drum 41, the members 42 and 43 of the clutch will slip before sufficient strain is exerted to break or disarrange the parts. If now the handle 52 of the controller is swung back to its normal position, the spring 48 will effect the disconnection of the clutch-drum from the axle and the slack in the chain 55 will be taken up. The lever 30 will not be moved, however, by this return of the controller to its normal position, and the brake will therefore remain set or applied until the controller-handle 52 is positively moved to the left, at which time the chain 53 will be slacked and the chain 55 will be pulled to move the lever 30 against the resistance of the spring 26, and thereby withdraw the clutch member 23 from engagement with the member 17, releasing the brake-shaft and the connected brake mechanism.

At this point attention may be called to the fact that since the mechanism comprehended by my invention is designed to be quickly attached to a vehicle the parts of which have already been assembled it is desirable to so construct the several elements associated with the axle 38 that they may be applied without necessity for jacking up a truck and removing a vehicle-wheel. To provide for such ready application of these parts to the axle, I construct the drum 37 and the clutch member 42 in sections, which after being assembled upon the axle are united by means of bolts 57 passed through opposed bolt lugs or flanges 58, extending from said sections. I also avoid the cutting out of the ordinary steel axle for the reception of a key by employing a key 59, of peculiar form, for effecting the fixed connection of the member 42 with the axle. As shown in Fig. 8, the bearing-face 60 of the key 59 is transversely curved, the radius of its curvature being less than the radius of the axle, so that sharp bearing-points 61 will be formed at each longitudinal edge of the key. When the key 59, which, as usual, is retained in the key-socket in the member 42, is urged against the axle by the screw 62, the bearing-points will engage the axle with a bite sufficient to hold the member 42 rigid therewith.

In drawing the claims I shall for the sake of brevity define the brake-shoes, the brake-lever, and the intermediate connections as "brake mechanism." The several elements for moving the brake-lever to apply the brakes by means of the advance of the vehicle will be designated "brake-setting mechanism," and the elements which serve to prevent the backward rotation of the shaft and including the brake-clutch I shall term "holding mechanism," since it is evident that in the broader aspects of my invention either of these mechanisms may be replaced by other constructions capable of performing the several functions thereof and adapted to be disposed in that relative arrangement necessary to their coöperation.

It will be clear from the foregoing that I have produced a novel, inexpensive, durable, and efficient brake mechanism designed to be set by power generated by the movement of the vehicle, arranged to be applied to the vehicle without skilled assistance, and capable of easy control at all times; but, while the present embodiment of the invention is believed at this time to be preferable, I do not limit myself to the structural details defined, as, on the contrary, I reserve the right to effect such changes, modifications, and variations of the illustrated structure as may be suggested by experience and experiment and embraced within the scope of the protection prayed.

What I claim is—

1. The combination with a vehicle, its wheels, axles and brake mechanism, of brake-setting mechanism operated by one of the axles and including an axle-clutch, brake-holding mechanism including a brake-clutch arranged to automatically hold the brakes applied, and a controller arranged to operate the axle-clutch to connect the setting mechanism to the axle or to disconnect it therefrom independently of the holding mechanism, said controller being also connected to the brake-clutch to operate the same for the purpose of releasing the brakes.

2. The combination with a vehicle, its wheels, axles and brake mechanism, of brake-setting mechanism operatively related to one of the axles, an axle-clutch controlling such operative relation, brake-holding mechanism for automatically retaining the brake mechanism in set position, a brake-clutch controlling the operative connection between the holding and brake mechanisms, and a common controller for said clutches, said controller being movable in one direction to connect the brake-clutch with the axle, and in another direction to release both clutches.

3. The combination with a vehicle, its wheels, axles and brake mechanism, of a rotary member, as for instance a brake-shaft, operatively connected to the brake mechanism, means for operatively connecting said rotary element with a vehicle-axle for actuation thereby, holding mechanism disposed to permit unrestricted rotary movement of said element in one direction and to prevent rotary movement thereof in the opposite direction, means for disconnecting the rotary element from its operating-axle, and means for releasing the holding mechanism to effect the release of the brake mechanism.

4. The combination with a vehicle, its wheels, axles and brake mechanism, of brake-setting mechanism disposed to be operated from an axle, holding mechanism for retaining the brake mechanism in set position, a brake-clutch constituting an element of the holding mechanism and freely movable in one direction only, under normal conditions, and means for operating the clutch to permit movement thereof in the opposite direction to effect the release of the brake mechanism.

5. The combination with a vehicle, its wheels, axles and brake mechanism, of brake-setting mechanism disposed to be operated from an axle, brake-holding mechanism including a brake-clutch, whose members have frictional connection, means for resisting the movement of one of the members in one direction only, and means for moving the other clutch member out of engagement to permit its unrestricted movement.

6. The combination with a vehicle, its wheels, axles and brake mechanism, of brake-setting mechanism disposed to be operated from an axle and comprising a brake-shaft having operative relation with the brake mechanism, holding mechanism including a brake-clutch comprising a clutch member rotatable with, but longitudinally movable upon, the brake-shaft and a second clutch member mounted for rotation in one direction only, and means for urging the members of the brake-clutch into and out of frictional engagement.

7. The combination with a vehicle, its wheels, axles and brake mechanism, of brake-setting mechanism disposed to be operated from an axle and including a brake-shaft operatively connected with the brake mechanism, a bearing-sleeve for the brake-shaft, a clutch member mounted on the bearing-sleeve, coöperating mechanism intermediate of the bearing-sleeve and clutch member for permitting the rotation of said clutch member in one direction only, a second clutch member mounted on the brake-shaft and connected thereto for rotation therewith, means for urging the clutch members into frictional engagement to prevent backward rotation of the brake-shaft, and means for moving said clutch members out of engagement to permit the release of the brake mechanism.

8. The combination with a vehicle, its wheels, axles and brake mechanism, of a brake-shaft operatively connected to the brake mechanism, drums mounted, respectively, upon said brake-shaft and upon one of the axles of the vehicles, a flexible piece having connection with said drums and designed to be wound from one to the other, a clutch controlling the connection between one drum and the axle, a brake-clutch constituting a holding device for the other drum, and means for operating the clutches.

9. The combination with a vehicle, its wheels, axles and brake mechanism, of a brake-shaft operatively connected to the brake mechanism, drums mounted upon said shaft and upon one of the vehicle-axles, respectively, a flexible piece, as for instance a chain, connected to said drums and designed to be wound from one to the other, an axle-clutch controlling the connection of one drum with the axle, a brake-clutch constituting a holding device for the other drum, and a controller connected to both of said clutches to effect their alternate actuation.

10. The combination with a vehicle, its wheels, axles and brake mechanism, of a brake-shaft operatively connected to the brake mechanism, drums mounted upon said shaft and upon one of the axles respectively, a flexible piece connecting the drums, an axle-clutch controlling the engagement of one drum with the axle, a brake-clutch constituting a holding device for the other drum, means normally urging the axle-clutch to its disengaged position, means normally urging the brake-clutch to its engaging position, and a controller connected to both of said clutches to effect their alternate actuation.

11. The combination with a vehicle, its wheels, axles and brake mechanism, of a brake-shaft operatively connected to the brake mechanism, drums mounted upon said shaft and upon one of the axles respectively, a flexible connection between said drums, an axle-clutch controlling the engagement of one of the drums with an axle, a brake-clutch constituting a holding device for the other drum, levers connected to the clutches, a single controller, and means for connecting said controller to both of the levers.

12. The combination with a vehicle, its wheels, axles and brake mechanism, of a brake-shaft operatively connected to the brake mechanism, drums mounted upon said shaft and upon one of the axles, respectively, a flexible connection between said drums, an axle-clutch controlling the engagement of one of the drums with an axle, a brake-clutch constituting a holding device for the other drum, levers connected to the clutches, and a plurality of controllers each having connection with both of said levers.

13. The combination with a vehicle, its wheels, axles and brake mechanism, said brake mechanism including brake-shoes, a brake-lever and intermediate connections, of a brake-shaft, a brake-chain extending from the brake-lever to the brake-shaft to be wound upon the latter, a fixed bearing-sleeve for the shaft, a clutch member mounted on said bearing-sleeve, a ball-clutch interposed between the clutch member and the bearing-sleeve, a second clutch member splined upon the brake-shaft, a lever connected to said last-named member, a drum keyed upon the brake-shaft, a second drum loosely mounted upon an axle, a chain extending between the drums and designed to be wound from one to the other, an axle-clutch disposed to connect the loose drum with the axle, a lever connected to the axle-clutch, springs disposed to urge the axle-clutch and the brake-clutch to their normal positions, a controller, and chains extending from the controller to each of the clutch members.

14. The combination with a vehicle, its wheels, axles and brake mechanism, of a drum loosely mounted upon one of the axles and operatively connected to the brake mechanism, a clutch member disposed to effect the engagement of the axle with the drum, a key mounted in said clutch member and having its inner face curved in greater degree than the periphery of the axle to define biting edges at opposite sides of the key, and means for urging the key into engagement with the axle, whereby the clutch member may be connected to the axle without necessity for recessing the latter.

In testimony that I claim the foregoing as my own I have hereto affixed my signature in the presence of two witnesses.

FRANK BOGART TOWNSEND.

Witnesses:
F. S. PLAISTED,
CHAS. WADDELL.